United States Patent [19]

Hirose

[11] 4,350,212

[45] Sep. 21, 1982

[54] STEP FEED DRILLING MACHINE

[75] Inventor: Noboru Hirose, Nagoya, Japan

[73] Assignee: Brother Kogyo Kabushiki Kaisha, Nagoya, Japan

[21] Appl. No.: 190,068

[22] Filed: Sep. 23, 1980

[30] Foreign Application Priority Data

Oct. 3, 1979 [JP] Japan .................. 54-127483

[51] Int. Cl.³ .............................. E21C 5/10
[52] U.S. Cl. .......................... 173/6; 408/10; 408/130
[58] Field of Search .............. 173/4, 5, 6, 7, 8, 11, 173/12, 19, 148, 150; 408/10, 11, 13, 130

[56] References Cited

U.S. PATENT DOCUMENTS

| | | | |
|---|---|---|---|
| 2,692,660 | 10/1954 | Good et al. | 408/130 |
| 2,706,917 | 4/1955 | Hill | 408/130 X |
| 2,854,871 | 10/1958 | Stratman | 408/130 X |
| 2,857,789 | 10/1958 | Robinson | 173/5 X |
| 3,155,172 | 11/1964 | Kazmm et al. | 173/6 |
| 3,598,497 | 8/1971 | Nyman | 408/11 X |
| 3,816,016 | 6/1974 | Schabzman | 408/11 |

Primary Examiner—Stephen G. Kunin
Assistant Examiner—Robert P. Olszewski
Attorney, Agent, or Firm—Browdy & Neimark

[57] ABSTRACT

A drilling machine comprises a quill, pneumatic cylinder for reciprocating the quill in the forward and backward direction, a feed control device which includes a liquid cylinder parallelly disposed to the quill and provided with a piston assembly with a projecting portion engageable with the quill for controlling the advancing speed of the quill, one-way clutch for allowing the piston assembly only the forward movement thereof by engaging with the projecting portion of the piston assembly, and an operation control device for repeatedly reciprocating the quill. The quill is advanced firstly at a rapid speed; upon engaging with the projecting portion of the piston assembly, the quill is advanced at a regulated speed by the liquid cylinder. When the quill has completed several times of reciprocation movement under the control of the operation control device, one working cycle is finished. When the quill assembly has reached the forwardmost position the operation control device is suspended of its controlling function for returning the quill to the original position. Returning of the quill to the original position releases the one-way clutch accompanied by the returning of the projecting portion of the piston assembly with the aid of a return spring.

9 Claims, 13 Drawing Figures

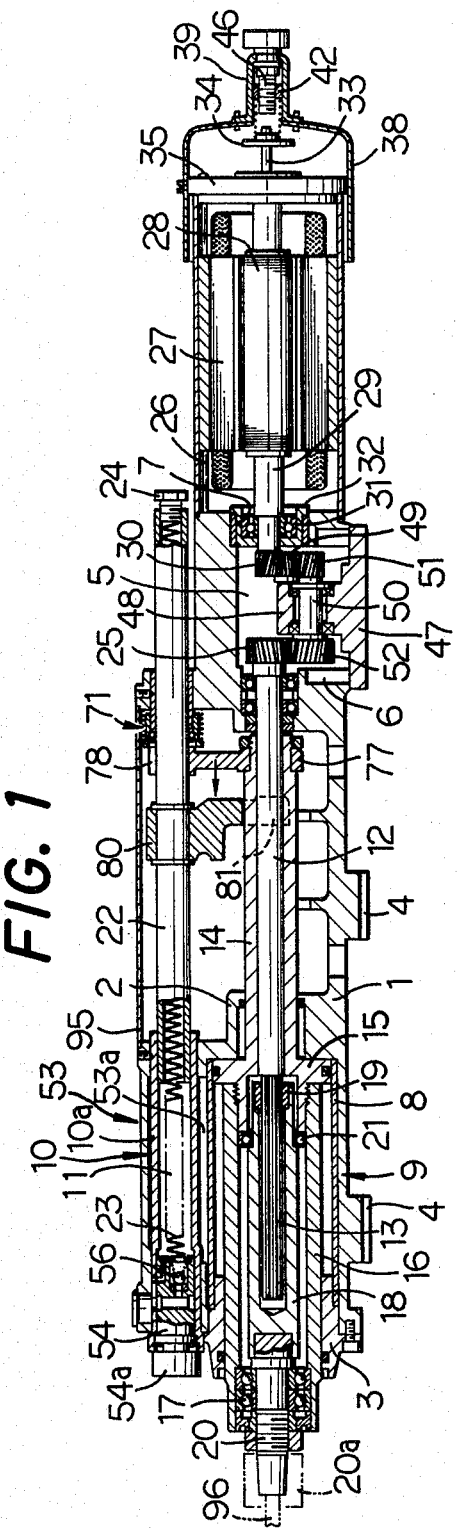
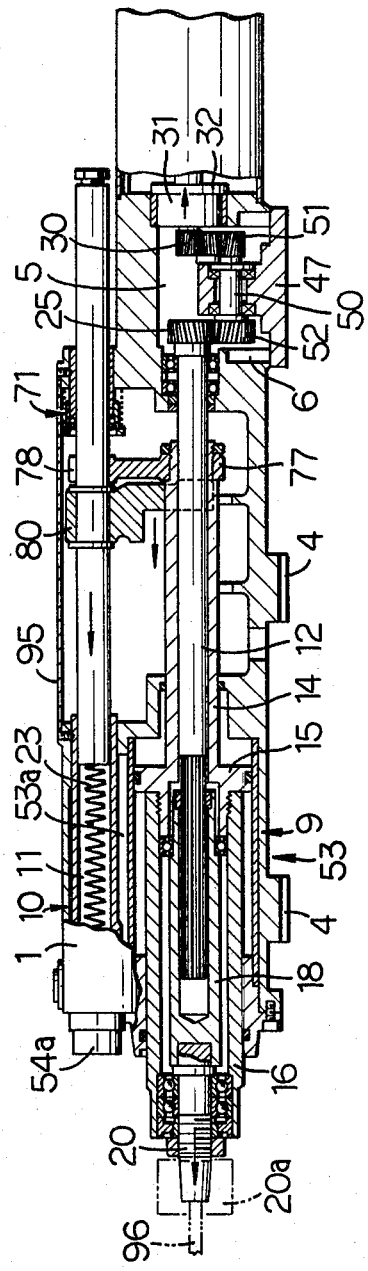
FIG. 1
FIG. 2

FORWARDMOST POSITION

ORIGINAL POSITION

STEP FEED DRILLING MACHINE

BACKGROUND OF THE INVENTION

This invention relates to a step feed drilling machine in which one drilling process is carried out, instead of being performed in a single stroke, by gradually deepening a bore-depth by means of repeating reciprocative movement of a tool for a plurality of times before completing the drilling process.

More particularly this invention is concerned with a drilling machine provided with pneumatic feed means for reciprocating a quill, feed control means for engaging with the advancing quill to control feed speed of the quill, and control means for controlling the reciprocative operation of the quill, wherein the tool is moved from a start position firstly at a rapid feed speed as far as a position slightly short of a work to be processed, moved forwards for a drilling process at a process feed speed, retracted once in a backward direction at a rapid speed due to the action of the control means, and moved again at the rapid feed speed as far as a nearby end position of the previous drilling process in order to resume another drilling process.

As a drilling machine of this type there has conventionally been one provided with a dog bar attached to the quill parallelly to the moving direction of the quill for being capable of integrally moving therewith, a speed change switch for switching the moving speed of the quill, and a dog temporally fixed on the dog bar, being biased by suitable biasing means, in an engageable manner with the speed change switch, wherein, after the engagement of the dog which has advanced with the quill with the speed change switch until the quill is retracted by the action of step feed control means, the dog is relatively moved to the dog bar resisting the action of the biasing means so that a distance the quill will be moved at the rapid feed speed again after having once been retracted may be longer than the distance of the previous advancing.

In this type structure, however, both a solenoid operated directional control valve for changing forward and backward motion of the quill and a solenoid operated directional control valve for changing the speed in the forward motion of the quill are required, inevitably enlarging the apparatus as a general tendency through the increase of the solenoid operated directional control valves. Furthermore, for returning the dog to the original position after completing one drilling process a specific returning device is needed, which in turn requires another control means for the returning device. The control means itself will be very complicated in addition to the above-mentioned solenoid operated directional control valves.

Another conventional type is provided with a pneumatic cylinder for reciprocating the quill, a liquid cylinder which comprises a cylindrical housing parallelly disposed to the quill and a piston rod with a projecting portion projecting from one end of the housing, for controlling the moving speed of the quill by engaging with the quill while the same is in forward motion, and control means for controlling the pneumatic cylinder so as to make the quill repeatedly reciprocate, whereby the piston rod which has been advanced with the quill is, everytime when the quill is retracted after a forward motion by the pneumatic cylinder, retained at the advanced position, and the quill is, when it is advanced again after the retraction, fed at a rapid feed speed as far as the position the piston rod is retained, so that the distance of the rapid feed of the quill may be gradually increased.

Most drilling machines belonging to this type are designed such that a liquid is positively supplied to the retracting side of the liquid cylinder for restoring the piston rod of the feed control means to the original position after the completion of one cycle of process. In this case, too, a solenoid operated directional control valve for changing the moving direction of the quill and another solenoid operated directional control valve for restoring the piston rod are required to be installed. This type is also not free from disadvantages similar to the previous example.

SUMMARY OF THE INVENTION

It is therefore a primary object of this invention to provide an improved step feed drilling machine, by eliminating the disadvantages inherent to the conventional machines, i.e. the prior art, being simple in structure and low in manufacturing cost.

In a preferred embodiment of this invention, the drilling machine is provided with (a) pneumatic feed means for reciprocating a quill, (b) feed control means which comprises a liquid cylinder having a cylindrical housing parallelly mounted to the quill and a piston assembly with a projecting portion projecting from one end side of the cylinder for engaging with the quill to change the moving speed thereof, and biasing means for biasing the piston assembly in the returning direction thereof, (c) one-way clutch allowing a motion in the advancing direction only of the projecting portion of the piston assembly, and operation control means for controlling the pneumatic feed means for making the quill repeatedly reciprocate, whereby the quill is forwardly fed firstly at a rapid feed speed, it is fed secondly after it has been engaged with the projecting portion of the piston assembly at a regulated feed speed by the feed control means, and then the quill is after having once been rapidly retracted by the action of the operation control means again advanced at the rapid feed speed as far as the position where the previous processing has reached. In a single drilling operation the quill is reciprocated several times by the action of the operation control means. When the quill has reached the forwardmost position, the action of the operation control means is ceased to retract the quill to the original or start position. By the returning of the quill to the start position the one-way clutch is released of the action for allowing the projecting portion of the piston assembly to return to the original position owing to the action of the biasing means.

As the projecting portion of the piston assembly is, after it has been moved with the quill in the forward motion, surely retained at the position by the action of the one-way clutch, irrespective of the returning of the quill by the action of the operation control means, the step feed of the quill can be performed exactly.

When the quill is retracted to the start position, the projecting portion of the piston assembly is returned, due to the mechanically interlocking release of the one-way clutch therewith, to the original position by the action of the biasing means, which enables elimination of the conventionally needed solenoid operated directional control valves with a great contribution to the miniaturization of the machine.

BRIEF DESCRIPTION OF THE DRAWINGS

FIG. 1 is an axial section, in elevation, of an embodiment of a drilling machine in accordance with this invention, wherein a quill is at the original position thereof;

FIG. 2 is an axial section, in elevation, of the same embodiment wherein the quill is at a transit position from the rapid feed to the normal processing feed;

DETAILED DESCRIPTION OF A PREFERRED EMBODIMENT

Figure 3:
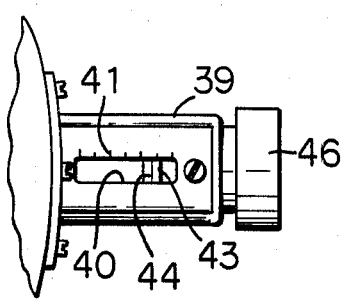
FIG. 3 is an enlarged elevation of a cylindrical casing.

With reference to the appended drawings a preferred embodiment of this invention will be described in detail hereunder.

Within an elongated casing 1, a drive shaft 12 and a hollow ram 22 are parallelly accommodated. A part of the casing 1 confined by a partition wall 2 disposed in a transverse direction and an end plate 3 fixed to the front end of the casing 1 is liquid tightly sealed. On the external surface of the casing 1 an attaching leg or flange 4 of wing form is integrally formed therewith. The drive shaft 12 is driven by a motor 27 disposed at the rear end of the casing 1 and provided with a spline shaft portion 13 on the forward end portion thereof. A hollow piston rod 14 accommodates the drive shaft 12 therein such that the latter may be concentrically and air tightly pierced into a pneumatic cylinder 9, whose housing is constituted of a cylinder tube 8 confined on both ends thereof by the partition wall 2 and the end plate 3. The drive shaft 12 is formed into a piston 15, which is slidable on the internal surface of the cylinder tube 8, on the forward end thereof. A quill 16 is securely fitted on the forward end portion of the hollow piston rod 14, being located further forward than the piston 15 so as to project outwardly from the end plate 3 in an air tight manner. The hollow piston rod 14, the piston 15 and the quill 16 constitute a quill assembly as a body, and the quill assembly constitutes the pneumatic cylinder 9 together with the above-mentioned housing.

A spindle 18 having a deep center bore is loosely fitted on the spline shaft portion 13 of the drive shaft 12 as to be concentrically located with the hollow piston rod 14 and the quill 16. At the open end portion of the deep center bore of the spindle 18 an internal spline member 19 is secured for being engaged with the spline shaft portion 13. On the tip of the spindle 18 a taper shaft 20, which is rotatably retained by bearings 17 held by the quill 16, is fixed. The spindle 18 is rotatably supported by a radial bearing 21 placed on the external surface at the rear end portion thereof. The spindle 18 is reciprocable with the quill assembly, i.e., the hollow piston rod 14, the piston 15 and the quill 16, while transmitting the rotation of the drive shaft 12 to the taper shaft 20 so as to rotate the same.

The hollow ram 22 is a kind of piston assembly, integrally forming a piston portion and a piston rod portion. The hollow ram 22 is at the forward end thereof fitted into a cylinder tube 10a, which is rotatably and oil tightly retained at both end portions thereof by the partition wall 2 and the end plate 3. The hollow ram 22 projects at the rear end thereof, piercing through a one-way clutch 71 disposed in the casing 1, outwards the casing 1. The hollow ram 22 is a pipe body concentrically accommodating therein a coil spring 23 which is abutted at the forward end thereof on a filter plate 68 of sintered metal and abutted at the rear end thereof to a screw plug 24. The filter plate 68 is disposed on the inside end of an oil-passage-forming member 54 which is oil tight and rotatably fitted into the cylinder tube 10a from the forward opening thereof. The cylinder tube 10a, the hollow ram 22 and the oil-passage-forming member 54 constitute a liquid cylinder 10 having a cylinder chamber 11 therein.

A cover 95 is removably attached on the casing 1 between the position corresponding to the partition wall 2 and the one-way clutch 71 for covering a side opening of the casing 1.

A gear chamber 5 is formed in the casing 1 so as to embrace the rear end of the hollow piston rod 14 which is provided with a driven gear 25 fitted thereon. The gear chamber 5 has a gear change window 6 on the flank thereof and a sliding hole 7 for slidably accommodating a bearing case 31 on the rear side thereof.

Figure 4:
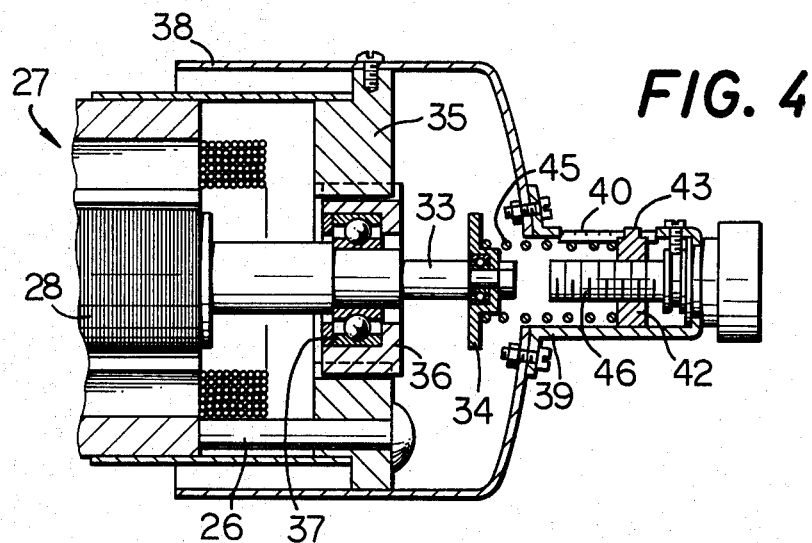
FIG. 4 is a plan view, in axial section, of the cylindrical casing.

On the rear side end of the casing 1 a motor 27 and on the further backward side thereof a circular pin support plate 35 are respectively secured by a few pins 26 projecting from around the sliding hole 7. On the pin support plate 35 a cap 38 is secured. The motor 27 may be an ordinary model, and an output shaft 29 projecting from a rotor 28 of the motor 27 is retained by bearing in the bearing case 31 slidably disposed in the sliding hole 7. On the forward end of the output shaft 29 a drive gear 30 is secured so as to be located in the gear chamber 5. On the bearing case 31 a flange 32, or a projecting piece, is formed sidewards along the end surface of the casing 1. The rear end portion of the output shaft 29 is retained by a bearing 37 in a bearing case 36 slidably and concentrically fitted in the center of the pin support plate 35 and from the rear end portion a small shaft 33 is projected backwardly. On the tip of the small shaft 33 projected from the pin supporting plate 35 a circular plate 34 insulated in rotation from the small shaft 33 by a bearing is fitted on. On the cap 38 a cylindrical casing 39 is attached on the rear side, and in the central portion, thereof, as shown in FIGS. 3 and 4. The cylindrical casing 39 is provided with an axially elongated observation hole 40 with a scaling or graduation 41 on the brim thereof; inside the cylindrical casing 39 an indicator plate 42, which functions as later described as a spring seat, with a projection on which a base line is marked is fitted such that the projection is fitted into the observation hole 40 for restricting rotation of the indicator plate 42. Between the indicator plate 42 and the circular plate 34 a compression spring 45 is spanned for biasing the rotor 28 as far as the flange 32 of the bearing case 31 abuts on the rear end of the casing 1. On the rear end of the cylindrical casing 39 an adjust screw 46 with a knob is disposed, being rotatable without an axial movement. The adjust screw 46 is threaded in the center of the indicator plate 42.

Numeral 47 designates a gear supporter which is removably fixed from outside the gear change window 6 for projecting a shaft retainer 48 deep into the gear chamber 5. On one side (right side in FIG. 1) of the shaft retainer 48 a first driven gear 49 engageable with a drive gear 30 is disposed; on one end of a counter shaft 50 which is carried by the shaft retainer 48 a second driven gear 51 engageable with the first driven gear 49 is disposed. On the other end of the counter shaft 50 a third driven gear 52 is engageable with the driven gear 25 to which the drive shaft 12 is secured. All of the drive gear 30, the driven gears 49, 51, and 52, as well as the driven gear 25 on the drive shaft 12 are of helical type. As the gear supporter 47 is removable, a few sets of driven gears from first to third are easily replaceable for changing the gear ratio as desired, with the object of changing the rotation speed of the drive shaft 12.

Figure 5:
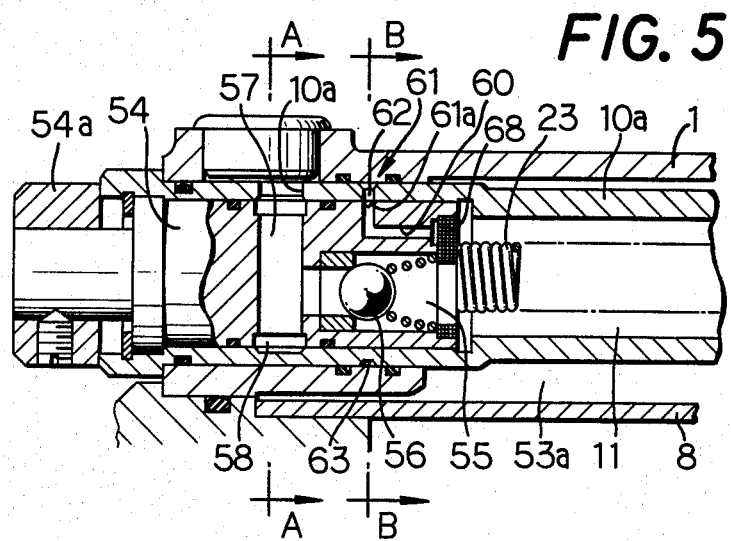
FIG. 5 is an enlarged axial section, in elevation, of an end portion of a cylinder chamber of a liquid cylinder.
Figure 6:
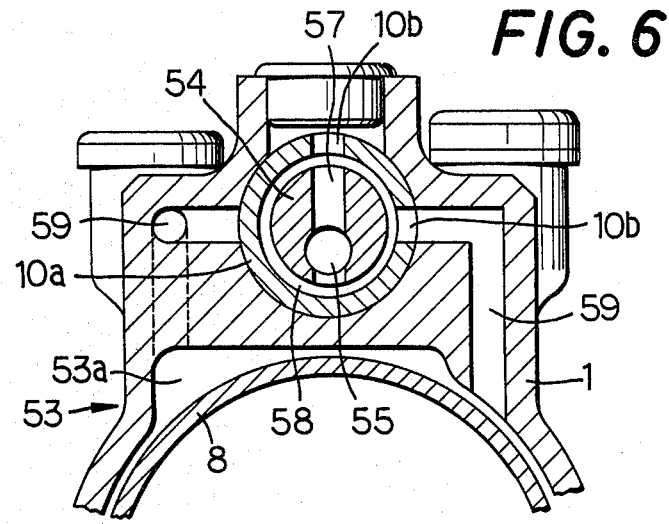
FIG. 6 is a cross-section of the cylinder chamber of FIG. 5 cut along the line A—A.
Figure 7:
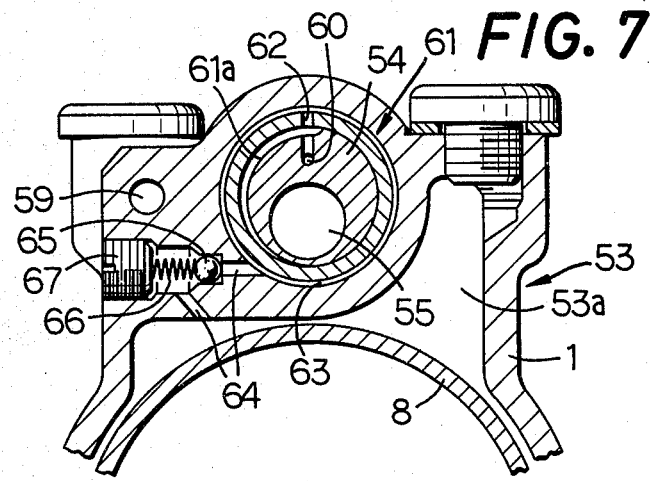
FIG. 7 is a cross-section of the cylinder chamber of FIG. 5 cut along the line B—B.

The cylinder tube 8 and the cylinder tube 10a constitute, together with the casing 1, the partition wall 2, and the end plate 3, an oil tank 53. The oil-passage-forming member 54 fitted into the cylinder tube 10a from its forward end is provided with, on the inside end portion thereof, an oil suction port 55 and an oil discharge port 60, as shown in FIG. 5. In the oil suction port 55 a check valve 56, in which a ball is urged on a valve seat, is installed. The oil suction port 55 is communicated to an oil flow passage 57 radially formed in the oil-passage-forming member 54. The outer end of the oil flow passage 57 is communicated to the oil storage chamber 53a of the oil tank 53 via an annular groove 58 formed on the external peripheral surface of the oil-passage-forming member 54, an opening 10b formed in the cylinder tube 10a, and a communication passage 59 formed through the wall of the casing 1 (see FIG. 6). The oil discharge port 60 is communicated to a throttle valve groove 61a of a crescent or half arcuate form circumferentially inscribed, being gradually varied in the depth of inscription thereof, on the external peripheral surface of the oil-passage-forming member 54 (see FIG. 7). The throttle valve groove 61a is in communication with a fine bore 62 formed in the cylinder tube 10a. The fine bore 62 is communicated on the outer side thereof to a circumferential groove 63, which is finally communicated, by way of a communication passage 64 containing a ball 65 and a compression spring 66 therein, to the oil storage chamber 53a of the oil tank 53. An adjusting screw 67 operable from outside of the casing 1 is capable of adjusting the degree of compression of the spring 66 for varying the resistance value due to the ball 65 to the discharging oil in the communication passage 64. A knob 54a on the forward end of the oil-passage-constituting member 54 is capable, through its operational rotation, of throttle adjustment by means of varying the communicating portion of the throttle valve groove 61a with the fine bore 62. That is, oil-passage-forming member 54 and the cylinder tube 10a constitute an adjustable throttle valve 61.

Figure 8:
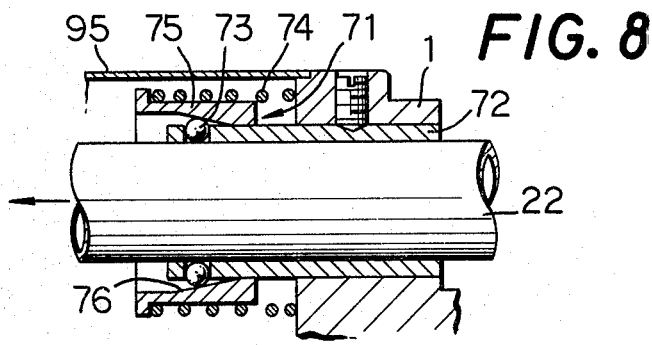
FIG. 8 is an enlarged axial section, in elevation, of a one-way clutch.

A one-way clutch 71 is constituted of, as shown in FIG. 8, an inner sleeve 72 secured to the casing 1 for being past through by the hollow ram 22, a few balls 73 retained on the inside end of the sleeve 72, and an outer sleeve 75 which is forwardly biased by a spring 74. On the internal surface of the outer sleeve 75 a taper portion 76 expanding in the forward direction for contacting with the balls 73 is formed. This one-way clutch 71 allows free moving of the hollow ram 22 toward the cylinder chamber 11, i.e., motion in the forward direction, but prohibits the motion in the reverse or backward direction. However, when the outer sleeve 75 is pushed backwards resisting the spring force of the spring 74 the hollow ram 22 is allowed to move freely in the backward direction.

Returning back to FIG. 1, numeral 77 designates a control arm, firmly fitted on the end portion of the hollow piston rod 14 and straddling at a yoke shaped portion 78 thereof the hollow ram 22 for being opposed on one side thereof to the forward end of the outer sleeve 75 of the one-way clutch 71. It functions at the illustrated original position in FIG. 1 to neutralize the one-way clutch 71 by pushing the outer sleeve 75 resisting the spring force of the spring 74. The control arm 77 is provided with a push projection 79 as can be seen in FIG. 10.

Numeral 80 designates an engaging arm fitted on the hollow ram 22 for straddling at a yoke shaped portion 81 thereof the hollow piston rod 14. When the control arm 77 advances together with the hollow piston rod 14, it abuts on the engaging arm 80 to bring the hollow ram 22 together therewith in the same direction. The engaging arm 80 has a projection 82 as can be seen in FIG. 10.

Figure 9:
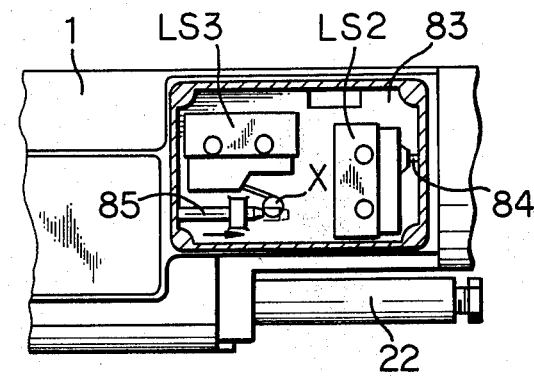
FIG. 9 is a partial elevation of a first switch chamber.
Figure 10:
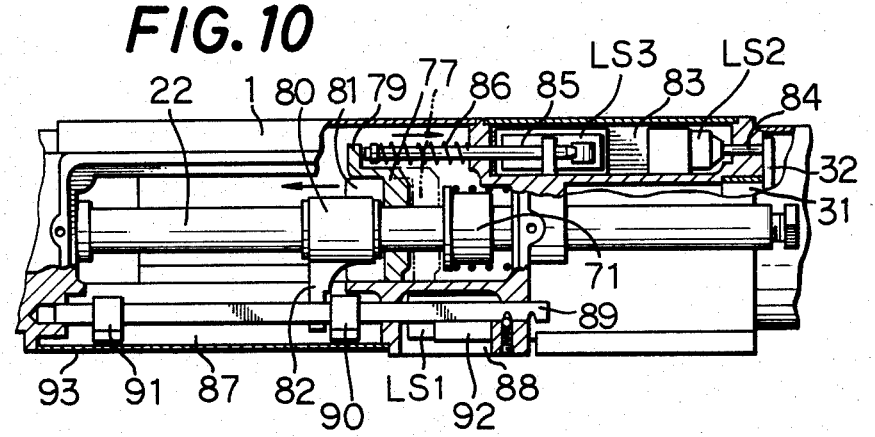
FIG. 10 is a plan view of a first switch chamber, a dog operating chamber, and a second switch chamber, partly broken away.

Beside the gear chamber 5 in the casing 1 a first switch chamber 83 is installed as shown in FIG. 10, wherein a limit switch LS2 and a limit switch LS3 are disposed. The limit switch LS2 is turned ON by being pushed by an operation pin 84 projected from the flange 32 of the bearing case 31 into the first switch chamber 83. A slide rod 85, which is at one end thereof opposed to the push projection 79 of the control arm 77, is projected into the first switch chamber 83 to be opposed to a switch contact lever X of the limit switch LS3 as shown in FIG. 9. While the slide rod 85 is not urged by the push projection 79, it is moved leftwards in the drawing, i.e. forward, to make the limit switch LS3 OFF.

Figure 11:
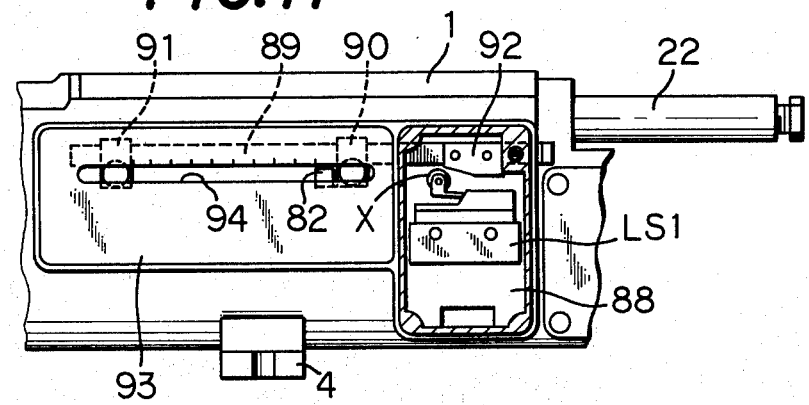
FIG. 11 is an elevation of a dog operating chamber and a part of a second switch chamber, partly broken away.
Figure 12:
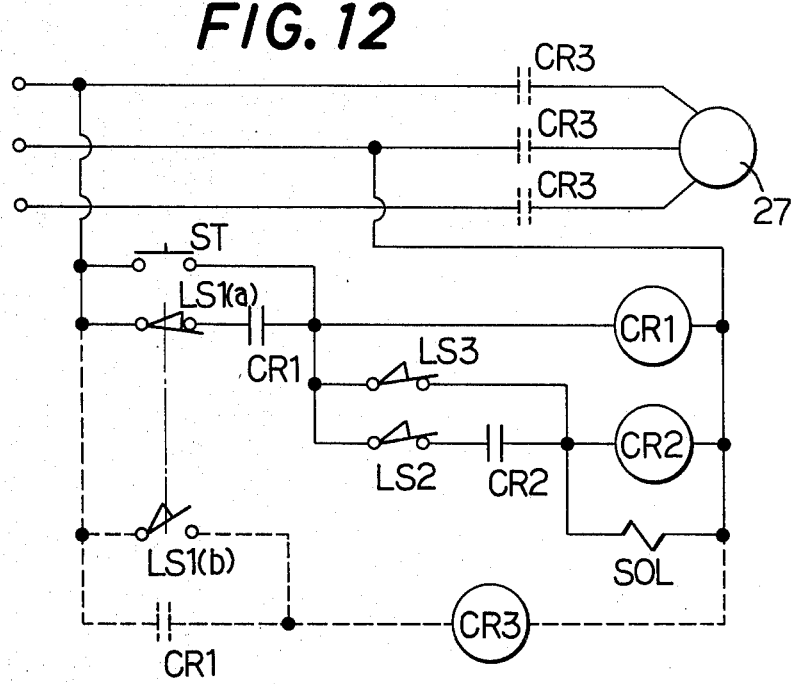
FIG. 12 s an electric circuit diagram.

A dog operating chamber 87 shown in FIGS. 10-11, into which the projection 82 of the engaging arm 80 is projected, and a second switch chamber 88 are installed within the operation range of the projection 82, in the casing 1; throughout both chambers 87, 88 a slide bar 89 is disposed, on which a first dog 90 and a second dog 91 are secured such that the projection 82 can abut on either of the former and the latter within the dog operating chamber 87. The first dog 90 is a member for determining the retracted position of the hollow ram 22 by being abutted by the projection 82 of the engaging arm 80 on the hollow ram 22 which is backwardly pushed back by the coil spring 23. The second dog 91 is a member for determining the forwardmost position of the tool (drill) which is attached to the taper shaft 20 via a chuck 20a. Therefore, both (90, 91) are arranged on the slide bar 89 so as to be movable for adjusting. To the slide bar 89 a cam 92 is secured so as to be opposed to the limit switch LS1 in the second switch chamber 88. The limit switch LS1 is provided with as shown in FIG. 12 a normal close contact LS1(a) and a normal open contact LS1(b); when a switch contact lever X is urged by a cam 92 the contact LS1(a) is opened and the contact LS1(b) is closed. The dog operating chamber 87 is provided with a cover 93 wherein a slit-like elongated hole 94 is formed for marking a scale or graduation on the brim thereof. The first dog 90 and the second dog 91 can be moved for adjustment through the elongated hole 94.

With reference to the electric circuit diagram in FIG. 12 the operation of this embodiment of the drilling machine will be described.

In a state wherein the hollow piston rod 14 is maintained at the start or original position, as shown in FIG. 1, accompanied by the backwardmost positioning of the hollow ram 22, depressing of a start switch ST in FIG. 12 will close a hold circuit including the contact LS1(a) of the limit switch LS1 due to the operation of the relay CR1 and another circuit of the relay CR3 for controlling the power supply to the motor 27. It will simultaneously close another circuit which includes the relay CR2, the limit switch LS3 and LS2 connected in parallel and a solenoid SOL of a directional control valve of the compressed air. The motor 27 is started and the compressed air is supplied to the pneumatic cylinder 9 by that, which advances the piston 15 and the hollow piston rod 14. The hollow piston rod 14 will be rapidly moved before the control arm 77 abuts on the engaging arm 80 of the hollow ram 22; thereafter the moving speed will be changed to the process feed speed, i.e., a drilling speed, by being regulated owing to throttling of the amount of the discharged oil from the cylinder chamber 11 of the hydraulic cylinder 10 to the oil storage chamber 53a of the oil tank 53 through the oil discharge port 60 and the throttle valve 61. At this timing the tool 96 begins drilling process upon contacting the work to be drilled and the drilling torque occurring on the drive shaft 12 gradually increases; when the torque exceeds a set value determined by the set load of the compressions spring 45 sliding separation in the axial direction between the first driven gear 49 and the drive gear 30 takes place, since both being helical type. As the first driven gear 49 is not allowed to slide axially, only the drive gear 30 is moved in the resisting direction to the elastic force of the compression spring 45, bringing together the output shaft 29 and the rotor 28. This movement carries the bearing case 31 in the same direction, causing the operation pin 84 of the flange 32 to release urging on the limit switch LS2 to be OFF. On the other hand advancing of the hollow piston rod 14 and the control arm 77 releases the urging by the push projection 79 on the slide rod 85, which brings about in succession pushing back of the slide rod 85 due to the spring 86 for turning the limit switch LS3 OFF soon after the excitation of the solenoid SOL. Therefore, the above-mentioned OFF operation of the limit switch LS2 simultaneously brings about the non-excitation of the relay CR2 and the solenoid SOL. Then a switching operation in the solenoid operated directional control valve takes place to supply the compressed air to the pneumatic cylinder 9 for pushing back the piston 15 in the backward direction. As the motor 27 is still in rotation the tool 96 is moved backward, while rotating out of the drilled bore, together with the drive shaft 12 and the spindle 18. Consequently the torque on the drive shaft 12 instantly decreases, with a result of allowing the rotor 28, etc., a slight advance for restoring the limit switch LS2 to ON operation. At this situation the relay CR2 is as stated earlier in non-operative condition, the limit switch LS2 which is connected in series with the contact of the same relay CR2 will not excite the solenoid SOL.

The one-way clutch 71 takes an attitude of allowing the hollow ram 22 to advance but prohibiting the same from returning, due to its mechanism wherein urging of the outer sleeve 75 by the control arm 77 is released whenever the control arm 77 is advanced from the original position so as to cause the taper portion 76 to urge the ball 73 on the hollow ram 22. Even when the hollow piston rod 14 and the control arm 77 are retracted together with the tool 96 the hollow ram 22 is not retracted due to the action of the spring 23 to stop there for keeping the engaging arm 80 at an advanced position by a certain distance.

The hollow piston rod 14 begins to urge, immediately before returning to the start position, the slide rod 85 for operating the limit switch LS3 ON so as to excite the relay CR2 and the solenoid SOL. It advances again the hollow ram 22, the hollow piston rod 14, etc. at the speed of the piston 15, or the rapid feed speed, before the control arm 77 abuts on the engaging arm 80 stationed at the previously advanced position. After the abutment they have to advance at the regulated processing feed speed in accordance with the discharge speed of the oil from the cylinder chamber 11. The position where the feed speed is changed corresponds to the position where the tool 96, which was retracted due to the excession of the torque over the set value determined by the compression spring 45, contacts again the bottom of the already drilled hole. Upon resuming the drilling process here, another excession of the torque on the tool 96, etc., over the set value causes the members concerned to be retracted again. The above-mentioned series of process will be repeated hereafter to make the drilled hole gradually deeper.

As can be understood from the above the compression spring 45, the operation pin 84, the limit switches LS2, LS3, etc., constitute a set of operation control means or device, as an example, which retracts the quill 16, everytime the torque applied on the drive shaft 12 exceeds a predetermined value, and turns it again on the way of returning to the advance movement.

When the drilling has been finished by reaching the target depth, that is, when the hollow piston rod 14 has reached the forwardmost position, the projection 82 formed on the engaging arm 80 of the hollow ram 22 is abutted on the second dog 91 for forwardly moving the slide bar 89. Opening of the normal close contact LS1(a) of the limit switch LS1 will sense the forwardmost position of the hollow piston rod 14 so as to make the relays CR1, CR2 and the solenoid SOL non-excited. Simultaneously the normal open contact LS1(b) is closed instead of the contact of the relay CR1 for maintaining the relay CR3 excited. It makes the driving of the motor 27 possible.

Being of the solenoid SOL non-excited, the piston 15 is finally retracted owing to the pneumatic cylinder 9. Even when the limit switches LS2, LS3 are, just like mentioned earlier, turned ON the solenoid SOL will not be operative for allowing the hollow piston rod 14 to return to the original position, and in turn, allowing the control arm 77 to push the outer sleeve 75 of the one-way clutch 71, so that the clutching function thereof will be neutralized. The hollow ram 22 can be therefore retracted owing to the elasticity of the spring 23; the projection 82 urges the first dog 90 for retracting the slide bar 89 as far as the cam 92 comes to abut on the internal wall surface of the second switch chamber 88, with a result of getting the cam 92 off the limit switch LS1. Consequently the normal close contact LS1(a)

returns to ON, and the normal open contact LS1(b) turns to OFF. The relay CR3 is made non-excited to stop the driving of the motor 27. One cycle of the drilling operation is finished in this way. The hollow ram 22 establishes or determined the original position with the aid of the first dog 90 for the next drilling cycle.

Figure 13:
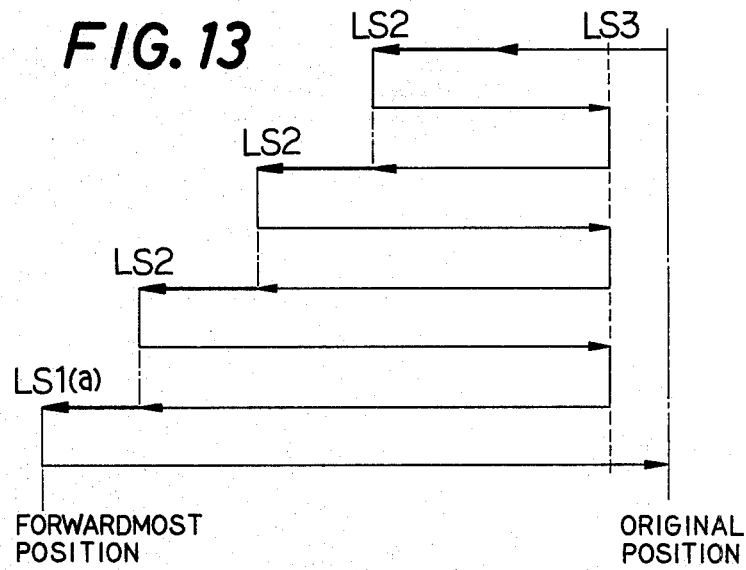
FIG. 13 is an explanatory diagram showing the step feed operation.

FIG. 13 is a diagram illustrating the above-mentioned step feed operation. Fine lines therein indicate the forward and backward movement in rapid speed in accordance with the piston speed in the pneumatic cylinder 9 and heavy lines the drilling feed regulated by the hollow ram 22. LS2 means the limit switch for changing the drilling feed in each step (stage) to the rapid return. LS3 means the limit switch for changing the rapid return to the rapid advance, and LS1 means the limit switch for changing, at the forwardmost position, the final drilling feed to the rapid return.

What is claimed is:

1. A drilling machine comprising:
   a frame having a liquid tank,
   a quill reciprocably mounted in the frame,
   a spindle rotatably mounted in the quill and having a tool at one end thereof,
   a motor operatively connected with the spindle for rotating the same,
   pneumatic feed means for reciprocating the quill in advancing and returning directions,
   feed control means for controlling the feed speed of the quill, including;
   (a) a hydraulic cylinder having a housing disposed in parallel with the axis of the quill and connected to the liquid tank at one end thereof through a liquid passage, and a piston assembly disposed within the housing and having a portion projecting from the other end of the housing,
   (b) means for biasing the piston assembly in the returning direction,
   (c) regulating means disposed in the liquid passage for regulating flow of liquid from the hydraulic cylinder to the tank and allowing free-flow of the liquid from the liquid tank to the hydraulic cylinder,
   (d) engaging means for engaging the quill with the projecting portion of the piston assembly when the quill arrives at a desired position in the forward movement thereof, whereby the quill is moved at a rapid speed by the pneumatic feed means until it engages with the projecting portion and then is moved at a slow speed controlled by the regulating means,
   one-way clutch disposed between the piston and the frame for permitting the movement of the piston assembly only in the advancing direction of the quill,
   first operation control means for controlling the pneumatic feed means to make the quill repeat a drilling cycle wherein the quill returns after a drilling operation and advance again for resuming the drilling operation,
   position sensing means for generating a sensing signal when the quill has been moved to the forwardmost position,
   second operation control means for stopping the operation of the first control means in response to the sensing signal from the position sensing means, and
   clutch releasing means for permitting the movement of the piston assembly in the returning direction of the quill when the quill has been moved to the backwardmost position.

2. A drilling machine according to claim 1, wherein the first operation control means comprising:
   torque sensing means for generating a signal when a torque beyond a predetermined value is applied to the spindle in the forward movement of the quill;
   position sensing means for generating a sensing signal when the quill is retracted to a predetermined position near the backwardmost position of the quill; and
   means for controlling the pneumatic feed means so as to retract the quill in response to the signal from the torque sensing means and advance the quill again in response to the sensing signal from the position sensing means for performing the drilling cycle.

3. A drilling machine according to claim 2, wherein the torque sensing means comprises:
   a pair of helical gears disposed in a power transmitting mechanism from the motor to the spindle, one of the gears being axially movable;
   a spring for biasing the one of the gears in the axial direction thereof, the one of the gears being moved against the action of the spring when the torque beyond the predetermined value is applied to the spindle; and
   switch means for generating a signal when the one of the gears is moved against the action of the spring.

4. A drilling machine according to claim 1, wherein the one-way clutch comprises:
   a sleeve member fixed to the frame for slidably retaining the projecting portion of the piston assembly, and having several through-bores radially formed in the wall thereof;
   balls positioned in each of the several through-bores;
   a movable member slidably mounted on the sleeve member and having conical internal surface which gradually expands in the advancing direction of the quill for engaging with the balls; and
   a spring member for biasing the movable member in the advancing direction of the quill, whereby the conical internal surface of the movable member normally presses the balls toward the projecting portion so as to prevent movement of the piston assembly in the returning direction of the quill, and the conical internal surface of movable member releases the pressure against the balls when the movable member is moved by the clutch releasing means in the returning direction of the quill against the action of the spring member so as to permit the movement of the piston assembly in the returning direction of the quill.

5. A drilling machine according to claim 4, wherein the clutch releasing means is an arm which is fixed to the quill for moving the movable member in the returning direction of the quill against the action of the spring member when the quill is returned to the backwardmost position.

6. A drilling machine according to claim 1, wherein the biasing means is a spring disposed between the piston assembly and the housing of the hydraulic cylinder.

7. A drilling machine according to claim 1, wherein the pneumatic feed means comprises a pneumatic cylinder having a cylinder tube disposed on the frame for accommodating the quill therein, and a piston portion fixed to the quill.

8. A drilling machine according to claim 7, wherein the liquid tank is constructed by utilizing the cylinder tube of the pneumatic cylinder and the frame as members for confining a liquid storage chamber therein.

9. A drilling machine according to claim 1, wherein the engaging means is an arm fixed to the projecting portion and having a fork shaped portion engaged with the quill.

* * * * *